United States Patent
Ishihara et al.

(10) Patent No.: US 8,600,586 B2
(45) Date of Patent: Dec. 3, 2013

(54) STABLE APPROACH MONITOR (SAM) SYSTEM

(75) Inventors: Yasuo Ishihara, Kirkland, WA (US); Kevin J Conner, Kent, WA (US); Steve Johnson, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 539 days.

(21) Appl. No.: 12/365,751

(22) Filed: Feb. 4, 2009

(65) Prior Publication Data

US 2010/0198432 A1 Aug. 5, 2010

(51) Int. Cl.
*G05D 1/00* (2006.01)

(52) U.S. Cl.
USPC ..... 701/9; 701/3; 701/14; 701/16; 244/17.13; 244/75.1; 244/182; 244/221; 244/234

(58) Field of Classification Search
USPC .............................................. 701/3, 9, 14, 16
See application file for complete search history.

(56) References Cited

U.S. PATENT DOCUMENTS

| | | | |
|---|---|---|---|
| 3,037,725 A | | 2/1960 | Treffeisen |
| 4,030,065 A | * | 6/1977 | Bateman ...................... 340/970 |
| 4,319,219 A | | 3/1982 | Rein-Weston |
| 4,433,323 A | * | 2/1984 | Grove .......................... 340/970 |
| 4,675,823 A | * | 6/1987 | Noland ......................... 701/300 |
| 5,031,102 A | * | 7/1991 | Robbins et al. .................... 701/5 |
| 5,047,942 A | * | 9/1991 | Middleton et al. .............. 701/15 |
| 5,220,322 A | | 6/1993 | Bateman et al. |
| 5,519,391 A | * | 5/1996 | Paterson et al. ............... 340/959 |
| 5,912,627 A | * | 6/1999 | Alexander .................. 340/815.4 |
| 6,043,758 A | * | 3/2000 | Snyder et al. .................. 340/970 |
| 6,711,479 B1 | | 3/2004 | Staggs |
| 6,794,007 B2 | | 9/2004 | Carr et al. |
| 6,982,655 B2 | * | 1/2006 | Vialleton et al. .............. 340/969 |
| 7,068,187 B2 | | 6/2006 | Ishihara et al. |
| 7,198,427 B2 | | 4/2007 | Carr et al. |
| 7,394,402 B2 | | 7/2008 | Ishihara et al. |
| 7,436,323 B2 | | 10/2008 | Ishihara et al. |
| 7,676,304 B2 | * | 3/2010 | Colich .............................. 701/8 |
| 7,945,425 B2 | * | 5/2011 | Marx et al. ..................... 702/183 |

(Continued)

OTHER PUBLICATIONS

Baals et al., A simplified chart for determining Mach number and true airspeed from airspeed-indicator readings, Mar. 1943, National Advisory Committee for Aeronautics.*

(Continued)

*Primary Examiner* — Thomas Black
*Assistant Examiner* — Sara Lewandroski
(74) *Attorney, Agent, or Firm* — Ingrassia Fisher & Lorenz, P.C.

(57) ABSTRACT

An improved stable approach monitor (SAM) system provides an audible advisory to a pilot when an aircraft is on a final landing approach. More specifically, the SAM system compares a measured airspeed of the aircraft to a predetermined flap placard speed. If the measured airspeed exceeds the predetermined flap placard speed then the improved SAM system provides an audible advisory indicating the airspeed of the aircraft is too fast. Advantageously, this audible advisory should prevent the pilot from attempting to deploy the flaps at an excessive airspeed and in turn focuses the pilot's attention on the problem at hand, which would be to reduce the airspeed of the aircraft. Once the airspeed is equal to or below the predetermined flap placard speed, the improved SAM system may provide another audible advisory informing the pilot to commence deployment of the flaps.

14 Claims, 2 Drawing Sheets

(56) References Cited

U.S. PATENT DOCUMENTS

| | | |
|---|---|---|
| 2001/0052562 A1 | 12/2001 | Ishihara et al. |
| 2003/0048203 A1* | 3/2003 | Clary et al. .................. 340/945 |
| 2004/0044446 A1 | 3/2004 | Straggs |
| 2005/0192718 A1* | 9/2005 | Delaplace et al. ................ 701/3 |
| 2005/0261813 A1* | 11/2005 | Ryan et al. ...................... 701/16 |
| 2005/0270180 A1 | 12/2005 | Ishihara et al. |
| 2006/0195235 A1* | 8/2006 | Ishihara et al. ................ 701/16 |
| 2007/0120708 A1* | 5/2007 | Ishihara et al. ............... 340/963 |
| 2007/0126602 A1* | 6/2007 | Bateman et al. ............. 340/959 |
| 2008/0274091 A1 | 11/2008 | Slepushkin et al. |
| 2009/0302174 A1* | 12/2009 | Ausman et al. ............. 244/76 R |

OTHER PUBLICATIONS

Honeywell; Enhancing safety and situational awareness; Dec. 31, 2008, pp. 1-4, XP55024538, Retrieved from the Internet: URL:http://www51.honeywell.com/aero/common/documents/myaerospacecatalog-documents/ATRBrochures-documents/EGPWS_Overview_ATR.pdf [retrived on Apr. 16, 2012] the whole document.

EP Office Action for application No. EP 10 151 559.7 dated Sep. 11, 2013.

* cited by examiner

STABLE APPROACH MONITOR (SAM) SYSTEM

BACKGROUND OF THE INVENTION

A conventional Stable Approach Monitor (SAM) operates to reduce landing risks and runway excursions by providing one or more audible advisories developed around a set of stable approach criteria. Generally, the stable approach criteria are developed around the Standard Operating Procedure (SOP) used by most major airlines and criteria developed by the Flight Safety Foundation. By way of example, the stable approach criteria may include altitude gates (i.e., height above runway) in which the "stability" of the aircraft is determined. In addition, the stable approach criteria provides that at these altitude gates, the aircraft must be properly configured to land, for example flaps at least partially deployed and the landing gear down. The aircraft must be on a proper glide slope and be traveling at or near a predetermined speed. In one sense, the stable approach criteria may determine a "stability envelope" such that if the aircraft is outside that envelope upon passing a selected altitude gate then the SAM will provide an audible advisory. Further, the stability envelope may be tailored, within certain limits, to meet additional or stricter requirements of individual airline SOPs. Ideally, the SAM should not provide nuisance advisories and thus should not be heard during normal operation of the aircraft.

By way of example, one type of SAM may provide an audible advisory such as "GEAR-GEAR" if the landing gear is not configured to land at a predetermined altitude. The SAM may provide an audible advisory such as "FLAPS-FLAPS" if the trailing edge flaps are not set at a predetermined flap detent at the predetermined altitude. Between a range of altitudes, for example between 950 feet and 450 feet above the runway, the SAM may provide an audible advisory such as "TOO HIGH, TOO HIGH" or "TOO FAST, TOO FAST." At 450 feet, if the pilots have not properly reacted to the one or more advisories, the SAM may announce "UNSTABLE, UNSTABLE," which operates as an instruction to the pilot to abort the landing and perform a go-around.

As noted, present SAMs provide a "FLAPS-FLAPS" advisory when the trailing edge flaps are not appropriately set as the aircraft descends below a predetermined altitude above the runway. Trailing edge flaps are deployed to increase the aspect ratio of the wing and to provide additional lift for the aircraft. The trailing edge flaps are generally moved through a number of different settings, detents or positions as the aircraft slows to its predetermined approach speed. The flap placard speeds indicate the maximum allowable for each flap detent. The purpose of the SAM advisory regarding flap deployment is to inform the pilot to deploy the trailing edge flaps in accordance with the stable approach criteria. One drawback of the existing SAM is when the aircraft speed is too high on final approach for landing flaps to have not been set. In this final approach scenario, the existing SAM provides an audible advisory to deploy the flaps based on the aircraft being at the predetermined height above the runway and independent of aircraft speed. If the pilot were to heed the advisory and deploy the flaps, there is a potential for structural damage to the flaps and the potential that a post-flight inspection of the flap system will be required.

SUMMARY OF THE INVENTION

The present invention generally relates to an improvement for a Stable Approach Monitor (SAM) system to provide more accurate audible advisories to a pilot when an aircraft is on its final landing approach. More specifically, the improved SAM system compares a measured airspeed of the aircraft to a predetermined flap placard speed. If the measured airspeed exceeds the predetermined flap placard speed then the improved SAM system provides an audible advisory indicating the speed of the aircraft is too fast (e.g., "TOO FAST, TOO FAST"). Advantageously, such an audible advisory should prevent the pilot from attempting to deploy the flaps at an excessive aircraft speed, and in turn should focus the pilot's attention on the problem at hand, which would be to reduce the speed of the aircraft before making any attempt to deploy the flaps. Once the speed of the aircraft is equal to or below the predetermined flap placard speed, the improved SAM system may then provide an audible advisory informing the pilot to deploy the flaps (e.g., "FLAPS-FLAPS").

In one aspect of the invention, a method for controlling deployment of trailing edge flaps during a final landing approach for an aircraft includes the steps of (1) measuring an airspeed of the aircraft; (2) comparing the measured airspeed to a predetermined flap placard speed; and (3) if the measured airspeed is greater than the predetermined flap placard speed, providing a first audible advisory informing the pilot that the speed of the aircraft is too fast.

In another aspect of the invention, an initial flap deployment system for controlling deployment of trailing edge flaps during a final landing approach for an aircraft includes a processor to receive a measured airspeed of the aircraft; a memory in communication with the processor to store a predetermined flap placard speed; and an audible advisory mechanism cooperating with the processor, the audible advisory mechanism operable to provide a first audible advisory to the pilot that the speed of the aircraft is too fast if the measured airspeed is greater than the predetermined flap placard speed.

BRIEF DESCRIPTION OF THE DRAWINGS

Preferred and alternative embodiments of the present invention are described in detail below with reference to the following drawings.

DETAILED DESCRIPTION OF ONE EMBODIMENT

Figure 1:
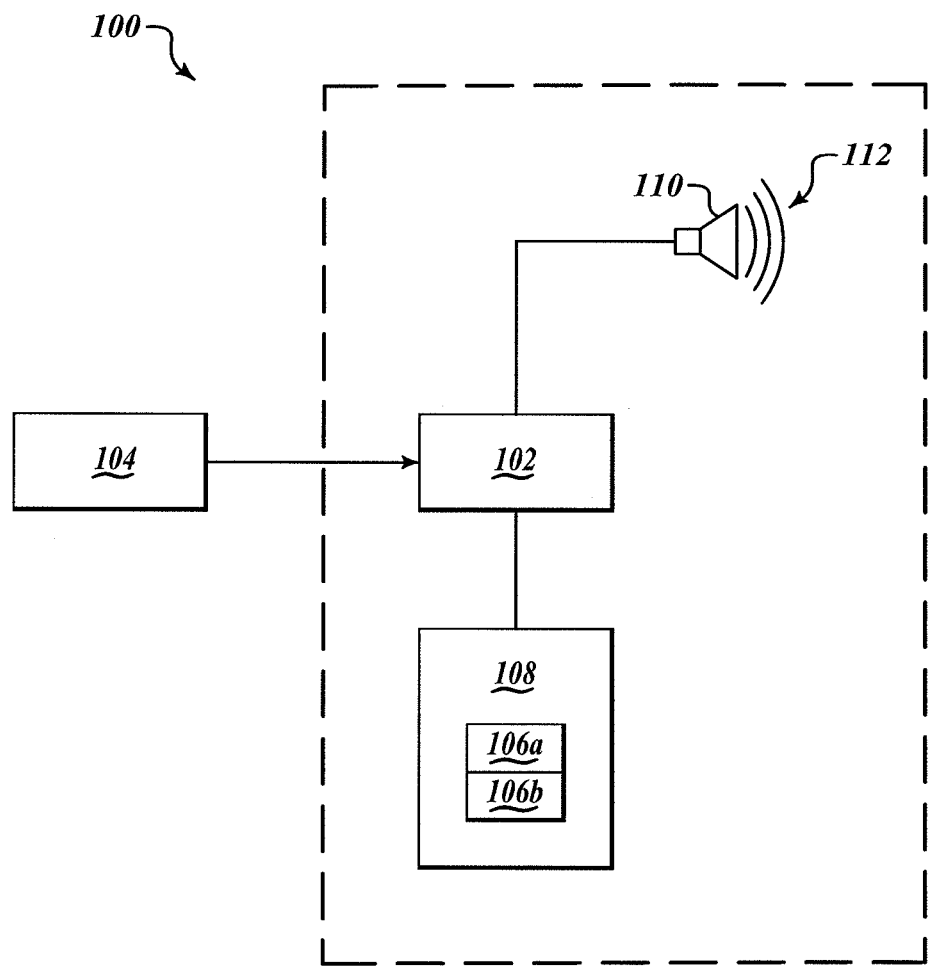
FIG. 1 is a diagram of a flaps advisory system for providing an audible advisory to a pilot of an aircraft according to an embodiment of the invention.

FIG. 1 shows an improved Stable Approach Monitor (SAM) system 100 having a controller or processor 102 that receives a measured airspeed 104 of an aircraft (not shown) from an airspeed measurement device 104, which may take the form of a pressure sensor. The processor 102 operates to compare the measured airspeed 104 to a predetermined flap placard speed 106a and to a set of stability criteria 106b. The predetermined flap placard speed 106a, the set of stability criteria 106b and other parameters may be stored in a memory 108 accessibly by the processor 102.

The predetermined flap placard speed 106a corresponds to a flap deployment speed determined by a structural capacity of the aircraft's flap system. The structural capacity relates to the structural design airspeeds as a function of altitude. In some cases, the structural design airspeeds are dictated or at least defined by government regulations. The predetermined flap placard speed 106a is a function of flap position and restricts the speed at which the flaps may be deployed for each flap setting or detent.

By way of example, during a final landing approach the set of stability criteria 106b generally requires the flaps be deployed to a selected setting, detent or position based on an approach target speed of the aircraft. The flap setting is indicative of each flap position. The flaps are extended from a retracted position to provide the wing with a larger aspect ratio and more lift (as compared to just the wing with the flaps fully retracted) even as the airspeed of the aircraft decreases.

In one embodiment as the aircraft enters into final landing approach, the processor 102 operates to compare the measured airspeed 104 to the predetermined flap placard speed 106a. If the measured airspeed 104 is greater than the desired flap placard speed 106a, a speaker device 110 provides a first audible advisory 112 informing a pilot (not shown) that the present airspeed of the aircraft is too fast. Even though the aircraft may be at an appropriate altitude in which the flap should be deployed, the flap advisory system 100 audibly makes the pilot aware of the excessive airspeed to prevent the pilot from even attempting to deploy the flaps. In one embodiment, the speaker device 110 may announce a phrase such as "AIRSPEED TOO FAST" or any similar phrase that provides sufficient information to inform the pilot about that the speed of the aircraft is too high to commence deployment of the flaps. Consequently, the flap advisory system 100 re-focuses the pilot's attention on the present problem, which is to reduce the airspeed of the aircraft.

Once the airspeed of the aircraft has been sufficiently reduced, the flap advisory system 100 by way of the speaker device 110 may provide another audible advisory to commence deployment of the flaps. For example, the speaker device 110 may audibly announce "FLAPS-FLAPS" as soon as the airspeed of the aircraft is equal to or below the desired flap placard speed 106a. It is appreciated however, that the audible phrases may take many forms and any phrase may be sufficient as long as it provides the appropriate information to the pilot as discussed above.

Figure 2:
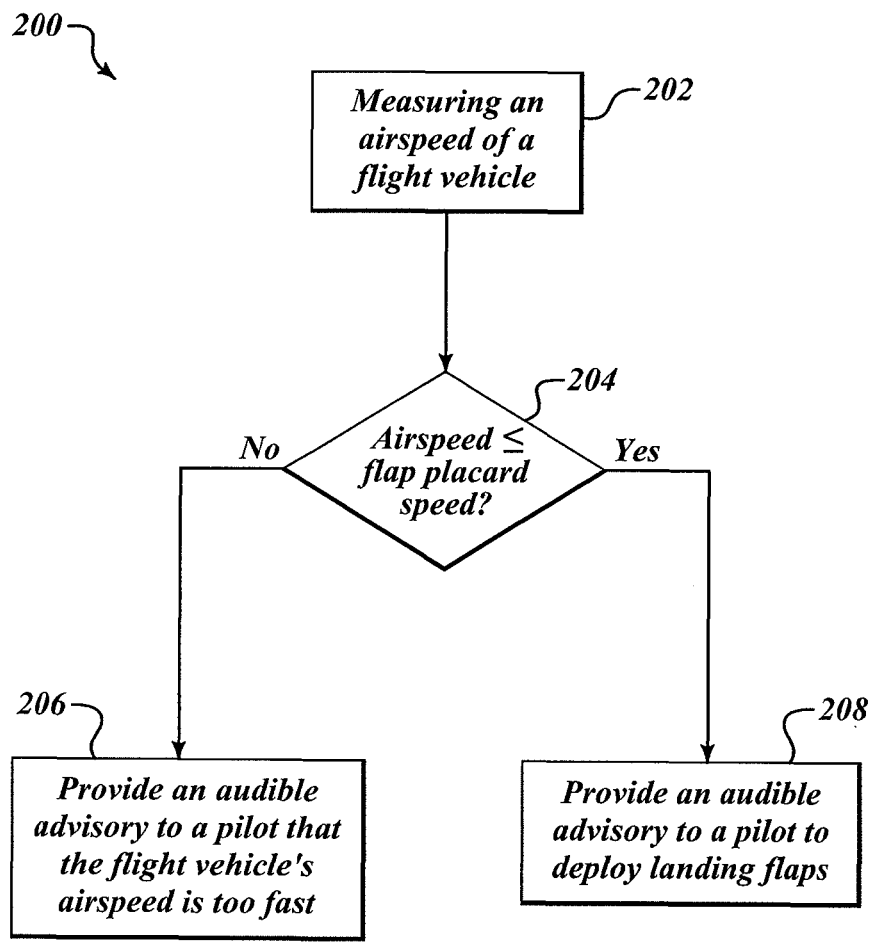
FIG. 2 is a method of providing an audible advisory to a pilot of an aircraft according to an embodiment of the invention.

FIG. 2 shows a method 200 for providing one or more audible advisories to the pilot of the aircraft regarding the operation of the improved SAM system 100 (FIG. 1) based on the set of stability criteria. At Step 202, a sensor measures the airspeed of the aircraft and provides the measured airspeed to the processor 102 (FIG. 1). At Step 204, the measured airspeed of the aircraft is compared to the predetermined flap placard speed. By way of example, the predetermined flap placard speed corresponds to the structural design airspeeds for deploying the flap system for various settings, detents or positions.

If the measured airspeed of the aircraft exceeds the predetermined flap placard speed, then at Step 206, the improved SAM system provides an audible advisory to the pilot that the airspeed of the aircraft is too fast. As noted above, the audible advisory may be a phrase such as "AIRSPEED TOO FAST." Once the airspeed of the aircraft has been reduced to be equal to or below the predetermined flap placard speed, then at Step 208, the improved SAM system provides an audible advisory to the pilot to commence deployment of the flaps. As noted above, this latter audible advisory may take for form of a phrase such as "FLAPS-FLAPS."

While one embodiment of the invention has been illustrated and described, as noted above, many changes can be made without departing from the spirit and scope of the invention. Accordingly, the scope of the invention is not limited by the disclosure of one embodiment. Instead, the invention should be determined entirely by reference to the claims that follow.

The embodiments of the invention in which an exclusive property or privilege is claimed are defined as follows:

1. A method comprising:
   measuring an airspeed of the aircraft;
   comparing the measured airspeed to a predetermined flap placard speed using a processing device;
   if the measured airspeed is greater than the predetermined flap placard speed, providing a first audible advisory informing the pilot that the speed of the aircraft is too fast to deploy the flaps; and
   outputting the provided first audible advisory using an audio device
   wherein the method is performed only after the aircraft has entered the landing approach and prior to flap deployment.

2. The method of claim 1, wherein providing the first audible advisory includes providing an excessive aircraft speed advisory to a pilot.

3. The method of claim 1, wherein the measured airspeed is further compared to a set of stability criteria using a Stable Approach Monitor (SAM) system.

4. The method of claim 1, further comprising:
   at the processing device, after the measured airspeed is equal to or less than the predetermined flap placard speed, providing a second audible advisory informing the pilot to deploy the flaps to a selected flap deployment position; and
   at the audio device outputting the second audible advisory.

5. The method of claim 4, wherein providing the second audible advisory includes providing a flaps deployment advisory to a pilot.

6. The method of claim 1, wherein comparing the measured airspeed to the predetermined flap placard speed includes computationally comparing the measured airspeed to the predetermined flap placard speed using a Stable Approach Monitor (SAM).

7. A flap deployment system located on an aircraft; the system comprising:
   a processor to receive a measured airspeed of the aircraft;
   a memory in communication with the processor to store a predetermined flap placard speed; and
   an audible advisory mechanism cooperating with the processor,
   wherein the processor is configured to perform the following only after the aircraft has entered a landing approach and prior to flap deployment,
      compare the measured airspeed to the flap placard speed; and
      provide a first audible advisory to the pilot that the speed of the aircraft is too fast to deploy flaps if the measured airspeed is greater than the predetermined flap placard speed after the aircraft has entered the landing approach,
   wherein the audible advisory mechanism is configured to output the first audible advisory.

8. The flap deployment system of claim 7, wherein the predetermined flap placard speed includes a structural design airspeed of the flap system as a function of altitude of the aircraft.

9. The flap deployment system of claim 7, wherein the predetermined flap placard speed includes a flap placard speed for deploying the flaps.

10. The flap deployment system of claim 7, wherein the audible advisory mechanism includes a speaker system.

11. The flap deployment system of claim 7, wherein the first audible advisory includes announcing an excessive aircraft speed advisory.

12. The flap deployment system of claim 7, wherein the processor is further configured to provide a second audible advisory including informing the pilot to deploy the flaps to a selected flap deployment position after the measured airspeed is equal to or less than the predetermined flap placard speed, wherein the audible advisory mechanism is configured to output the second audible advisory.

13. The method of claim 1, wherein the predetermined flap placard speed indicates speed at which flaps may be safely deployed.

14. The system of claim 7, wherein the predetermined flap placard speed indicates speed at which flaps may be safely deployed.

* * * * *